United States Patent
Becker et al.

(10) Patent No.: US 7,127,044 B1
(45) Date of Patent: Oct. 24, 2006

(54) POOLING NUMBERS FOR E911 CALLS FROM UNNAMED ENDPOINTS

(75) Inventors: Gary Becker, Thornton, CO (US); David L. Chavez, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 22 days.

(21) Appl. No.: 10/882,984

(22) Filed: Jun. 30, 2004

(51) Int. Cl.
*H04M 11/00* (2006.01)

(52) U.S. Cl. ....................................... 379/45
(58) Field of Classification Search ............ 379/45, 379/90.01; 370/352
See application file for complete search history.

(56) References Cited

U.S. PATENT DOCUMENTS

| | | | |
|---|---|---|---|
| 6,076,121 A | 6/2000 | Levine | 710/62 |
| 6,580,908 B1 | 6/2003 | Kroll et al. | 455/435 |
| 6,650,901 B1 | 11/2003 | Schuster et al. | |
| 6,678,357 B1 * | 1/2004 | Stumer et al. | 379/45 |
| 6,757,359 B1 * | 6/2004 | Stumer et al. | 379/45 |
| 6,804,329 B1 * | 10/2004 | Geck et al. | 379/45 |
| 2005/0063519 A1 * | 3/2005 | James | 379/45 |
| 2005/0083911 A1 * | 4/2005 | Grabelsky et al. | 370/352 |

OTHER PUBLICATIONS

Avaya "Administrator's Guide for Avaya Communication Manager: vols. 1, 2, and 3," 555-533-506, Issue 7 (Nov. 2003), pp. 121, 129, 886, 889, 1169, 1193, 1555.
Comments of Nortel Networks, Before the Federal Communications Commission, WC Docket No. 04-36, May 28, 2004, pp. 1-22 with Appendices 1-4.
Schulzrinne, *"Providing Emergency Call Services for SIP-based Internet Telephony"*, printed Oct. 5, 2005, http://www.iptel.org/info/players/ietf/location/draft-schulzrinne-sip-911-00.txt, Jul. 2000, pp. 1-14.

* cited by examiner

*Primary Examiner*—Stella Woo
(74) *Attorney, Agent, or Firm*—Sheridan Ross P.C.

(57) ABSTRACT

A system for providing emergency location information to an emergency service provider is provided. The system includes (a) an input 118 and 122 operable to receive, from a registered communication device 112 and 114, an emergency contact and (b) an agent 146 operable to (i) determine whether the communication device 112 and 114 has a corresponding assigned extension; (ii) when the communication device 112 and 114 has no corresponding assigned extension, assign, from a set 150 of unassigned extensions, an extension to the communication device 112 and 114; and (iii) forward at least one of the assigned extension and an extension different from the assigned extension to emergency personnel.

24 Claims, 2 Drawing Sheets

POOLING NUMBERS FOR E911 CALLS FROM UNNAMED ENDPOINTS

CROSS REFERENCE TO RELATED APPLICATION

Cross reference is made to U.S. patent application Ser. No. 10/795,119, filed Mar. 5, 2004, entitled "Advanced Port-Based E911 Strategy for IP Telephony" and Ser. No. 10/607,414, filed Jun. 25, 2003, entitled "Universal Emergency Number ELIN Based on Network Address", each of which is incorporated herein by this reference.

FIELD OF THE INVENTION

The present invention is directed generally to emergency assistance and crisis alert call handling and specifically to emergency assistance and crisis alert call handling in a telecommunications network.

BACKGROUND OF THE INVENTION

Local regulations, as well as concerns about public safety and liability, require enterprises to provide employees and visitors with an effective means to reach a universal emergency number (e.g., 911 in the U.S., 000 in Australia, and 112 in the European Community) operator in an emergency. The call routes through the local central office, through a switch, to the appropriate Public Safety Answer Point (PSAP), where the call is answered. Each PSAP typically covers one metropolitan area or several or rural counties. At the PSAP, emergency operators determine the nature of the emergency and contact the appropriate agency: typically police, fire, or emergency medical services. A single PSAP is typically responsible for an area covering several independent police and fire departments in the U.S.

With Enhanced 911 (E911), the calling party number, known as an Emergency Location Information Number (ELIN), is sent with the emergency call over Centralized Automatic Message Accounting (CAMA) trunks or via the calling number information element over Integrated Services Digital Network (ISDN) trunks. A suitably configured module at the PSAP uses the ELIN to lookup the caller's documented street address location from the Automatic Location Information (ALI) database. In ISDN, the ELIN is referred to as the location identification number.

To allow operators at the PSAP to call back a caller, IP communication systems use Public Switched Telephone Network (PSTN)-based methods to send an ELIN that identifies the telephone number for an extension from which the emergency call was dialed. If the extension number is not public, premise-based communications systems can be programmed to send an ELIN that is located nearby the calling extension. This is typically done by setting up the Local Area Network (LAN)-based telephony system itself, a media gateway, or a separate server, to automatically send a properly formatted number, such as the public telephone number. To deliver this information to the public emergency services network, the information can be encoded over analog CAMA (which requires an 8-digit ELIN), or over digital ISDN trunks (which require a 10-digit ELIN).

Handling of emergency and crisis alert calls can be complicated when a calling communication device does not have a corresponding extension number. Many enterprises deploy packet-switched and circuit-switched telephones having no personality or number (often referred to as unmerged, x-port, TTI stations or disassociated or unnamed registered stations). There are a number of reasons for using such stations. For example, such station configurations are used in hotelling applications, when an extension is moved from one phone to another (such as through the use of an access code), when a newly installed phone has been registered but not yet assigned an extension, and when administrators do not yet know who will be assigned to the phone (such as a phone in an empty office). During an emergency, a call may be placed by a person using an unnamed station. In the event that emergency personnel attempt to call the person back, such as when the emergency call is disconnected or otherwise terminated prematurely, the switch is unable to direct the call to the calling communication device. Due to the obvious complications from being unable to make an emergency call back, a number of states now require caller identification on 911 calls down to the station level.

Instead of sending the calling number, current switches can send different numbers to the PSAP, when those numbers best represent a user's physical location. Calls to the sent number are forwarded or bridged to the calling number. This capability allows the caller to be called back by responding emergency personnel. However, this function cannot be provided to stations that do not have a number at all, as is the case for unnamed stations.

SUMMARY OF THE INVENTION

These and other needs are addressed by the various embodiments and configurations of the present invention. The present invention is generally directed to a system and method for dynamically assigning an extension number from a set or pool of (currently unassigned and available extensions) to any communication device to satisfy the needs of the time and/or to support system capabilities needing temporary use of extensions.

In one embodiment, call back information associated with an emergency contact is provided to emergency service or crisis alert personnel, such as police, fire, and medical personnel, by selecting an extension number from the set or pool of extension numbers for assignment to the contacting communication device when the device does not then possess an assigned extension. The extension is temporarily assigned to the communication device and, when the temporary assignment is over, returned to the pool for reassignment to another communication device as needed. When the emergency contact is placed, a number representing the contacting communication device's physical location would be forwarded to emergency or crisis alert personnel. The forwarded number may be the same as or different from the assigned extension. In one configuration, the forwarded number is an ELIN. When a different extension is used, call forwarding or bridging is assigned to the temporary extension to allow for call back to the contacting communication device to occur. This embodiment permits registered but unnamed communication devices to receive emergency call backs in the event that the emergency call is prematurely disconnected. It thereby can permit compliance with many states' regulations requiring caller identification on 911 calls down to the station level.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved caller location. The term "contact" or "call" as used herein is intended to include not only telephone calls but also non-telephonic communications, such as data transmissions such as electronic mail, voice-over-IP, instant messaging, teletypewriter (TTY), facsimile, etc., whether circuit switched or packet switched.

Figure 1:
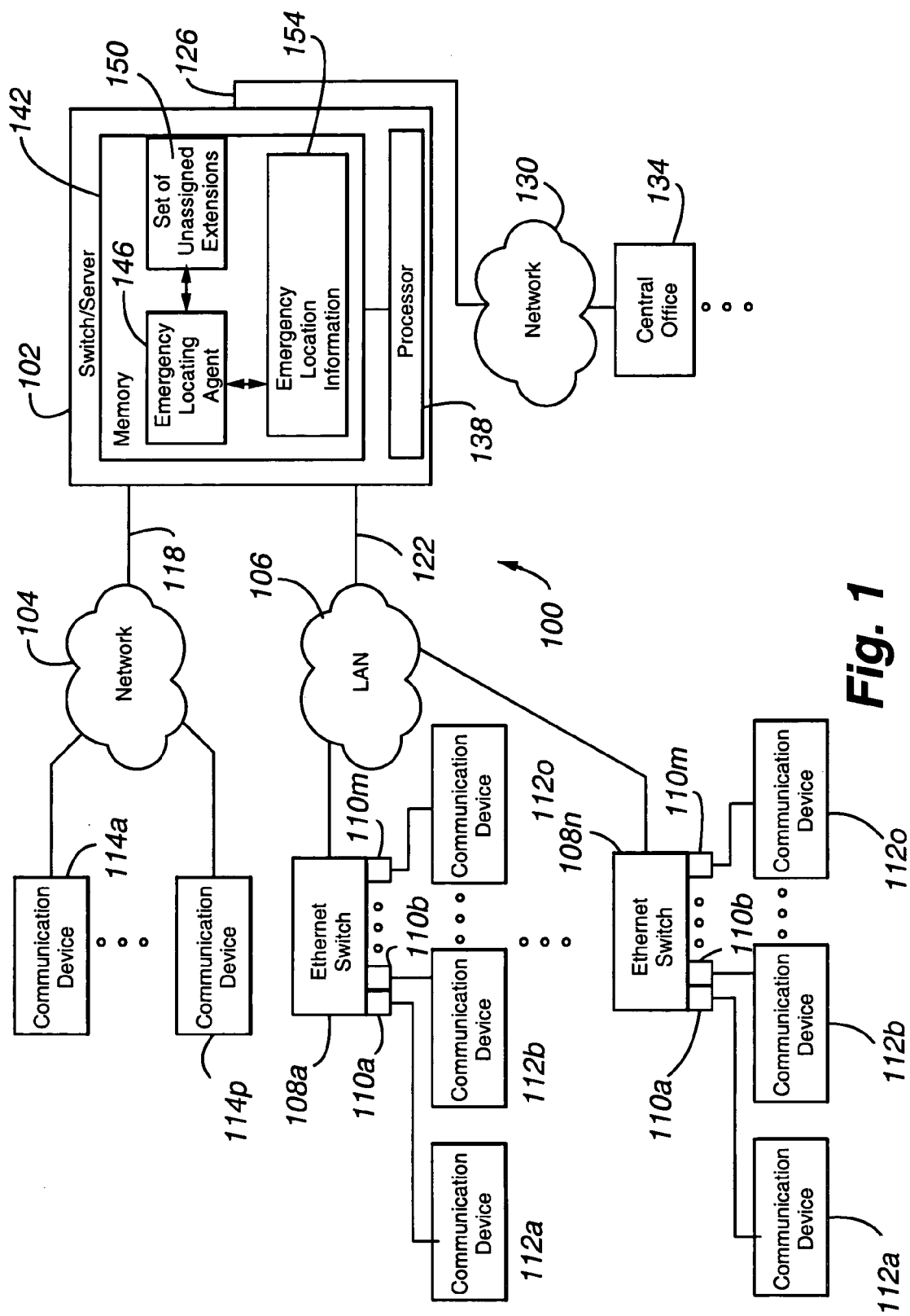
FIG. 1 is a block diagram of an emergency locating infrastructure according to an embodiment of the present invention and FIG. 2 is a flow chart of the operation of the emergency locating agent according to an embodiment of the present invention.

FIG. 1 shows an exemplary communication system 100 in which the invention is implemented. The system 100 includes a switch/server 102 which serves a circuit-switched enterprise network 104 and a packet-switched Local Area Network 106. The LAN 106, in one configuration, is a data or distributed processing network, such as the Internet and applies the TCP/IP suite of protocols. The LAN is divided into a plurality of subnets, each including one or more Ethernet switches 108a–n, respectively. Each switch 108a–n is connected (via ports 110a–m) to and serves a number of packet-switched communication devices 112a–o that are registered with the switch/server 102. "Registration" is a process by which a communication device is made known to a switch/server. As will be appreciated, the registration can be performed by any technique or according to any protocol (e.g., such as H.323, SIP, 802.11, digital port initialization, and the like) and may by effected by the system administrator and/or through another suitable manual or automated technique. Likewise, the enterprise network 104 is connected to a plurality of circuit-switched communication devices 114a–p. Each of the communication devices 112a–o and 114a–p may be wired desktop telephone terminals or any other type of wired or wireless device capable of communicating with the switch/server. The word "communication device" as used herein should therefore be understood to include not only wired or wireless desktop telephone terminals but also other types of processor-based communication devices, including without limitation mobile telephones, IP telephones, IP softphones, IP hardphones, personal computers, personal digital assistants (PDAs), TTY Teletype, etc.

The terms "switch" or "server" or "switch/server" as used herein should be understood to include a PBX, an enterprise switch, or other type of telecommunications system switch, as well as other types of processor-based communication control devices such as servers, computers, adjuncts, etc. By way of example, the switch/server in the exemplary embodiment may be implemented as an otherwise conventional DEFINITY™ or MULTIVANTAGE™ Enterprise Communication Service (ECS) communication system or Avaya Communication Manager™ switch available from Avaya Inc. Other types of known switches/servers are well known in the art and therefore not described in detail herein.

The switch/server is coupled via one or more communication lines 118 and 122 to networks 104 and 106, respectively. In one configuration, the communication line 122 is packet-switched while the communication line 118 is a circuit-switched trunk line. The switch/server is also connected to a circuit-switched trunk line 126 that is in turn connected to the circuit-switched network 130, which is typically the Public Switched Telephone Network (PSTN). The lines carry incoming and outgoing contacts from the networks to the switch/server for processing. Preferably, the networks or other transit networks between the user's communication device and the switch/server and between the central office and the switch/server are configured such that the switch receives not only the intended destination address but also the source address or identity of the communication device initiating the contact. In one configuration, the communication medium 126 is a Centralized Automatic Message Accounting (CAMA) or Integrated Services Digital Network (ISDN) trunk.

It should be noted that the invention does not require any particular type of information transport medium between the switch/server and the communication devices, i.e., the invention may be implemented with any desired type of transport medium as well as combinations of different types of transport media and with any desired type of network connection.

The switch/server 102 is in communication via network 130 with a central office 134. The central office 134 routes calls to a universal emergency number to a switch (not shown), which in turn routes the call to the appropriate Public Safety Answer Point (PSAP) (not shown), where the call is answered. The Emergency Location Information Number (ELIN) is sent by conventional techniques with the emergency call over the communication medium 126, such as via CAMA or via ISDN as the calling number information element. A suitably configured module (not shown) at the PSAP uses the ELIN to lookup the caller's documented street address location from the Automatic Location Information (ALI) database (not shown).

It should be emphasized that the configuration of the switch/server, communication devices, and other elements as shown in FIG. 1 is for purposes of illustration only and should not be construed as limiting the invention to any particular arrangement of elements.

The switch/server includes a processor 138 and a memory 142. The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor operating in conjunction with the memory executes one or more software programs depicted in FIG. 1 as the emergency locating agent 146 and accesses various data structures, including the set of unassigned (and unused) extensions 150 and emergency location information 154, in memory and/or an associated (separate) database. The emergency location information can include mapping tables, such as those described in copending U.S. application Ser. No. 10/795,119, filed Mar. 5, 2004, entitled "Advanced Port-Based E911 Strategy for IP Telephony" and Ser. No. 10/607, 414, filed Jun. 25, 2003, entitled "Universal Emergency Number ELIN Based on Network Address", and associations of registered unnamed communication devices with temporarily and dynamically assigned extensions from the set of unassigned extensions. The extensions in the set 150 can be any electronic address recognizable to the switch/server, whether Direct Inward Dialing extensions or non-DID extensions. As will be appreciated, the mapping tables map a calling device identifier (e.g., switch host name, port number, Uniform Resource Identifier, IP address, MAC address, or any other electronic address), against a physical or geographical location of the device and/or corresponding ELIN. When a call to a universal emergency number is received from a registered but unnamed communication device, the emergency locating agent 146 assigns an extension from the set of unassigned extensions to the calling device (or to a calling device identifier) and accesses the emergency location information to determine, for the calling communication device, the appropriate ELIN that best represents the caller's physical location (possibly in place of the temporarily assigned calling party extension number) to forward to the central office. When a number other than the assigned extension is forwarded to the PSAP, calls to the forwarded extension (which is typically an ELIN) will be automatically forwarded within a pre-designated time or emergency call back interval to the caller's extension. In an alternative configuration, PSAP calls back to the forwarded extension can be bridged to the forwarded extension and to the assigned extension so that both communication devices ring simultaneously.

The term "table" should be understood to include any ordered set of information or data stored in memory or other storage device accessible to the switch. The invention does not require that the information be stored in any particular length or format, e.g., a tabular format, a closed- or open-set, or location and numerous suitable storage formats and storage locations will be readily apparent to those skilled in the art.

The switch/server may include additional elements that are omitted from FIG. 1 for simplicity and clarity of illustration. For example, the switch/server may include an external database to store system configuration information, service circuits such as tone generators, announcement circuits, etc., and a port card for each type of user communication device associated therewith. Also associated with the switch/server may be an administrator terminal (not shown) which is used to program the operation of the switch/server during system administration, e.g., an initial set-up and configuration of the system of a subsequent system-level or user-level configuration. Other devices not shown in the figures may be associated with the switch/server, such as an adjunct feature server. Such an adjunct server may be physically incorporated within the switch/server and may be partially or completely implemented using other switch/server elements such as the processor 224 and memory 228.

Figure 2:
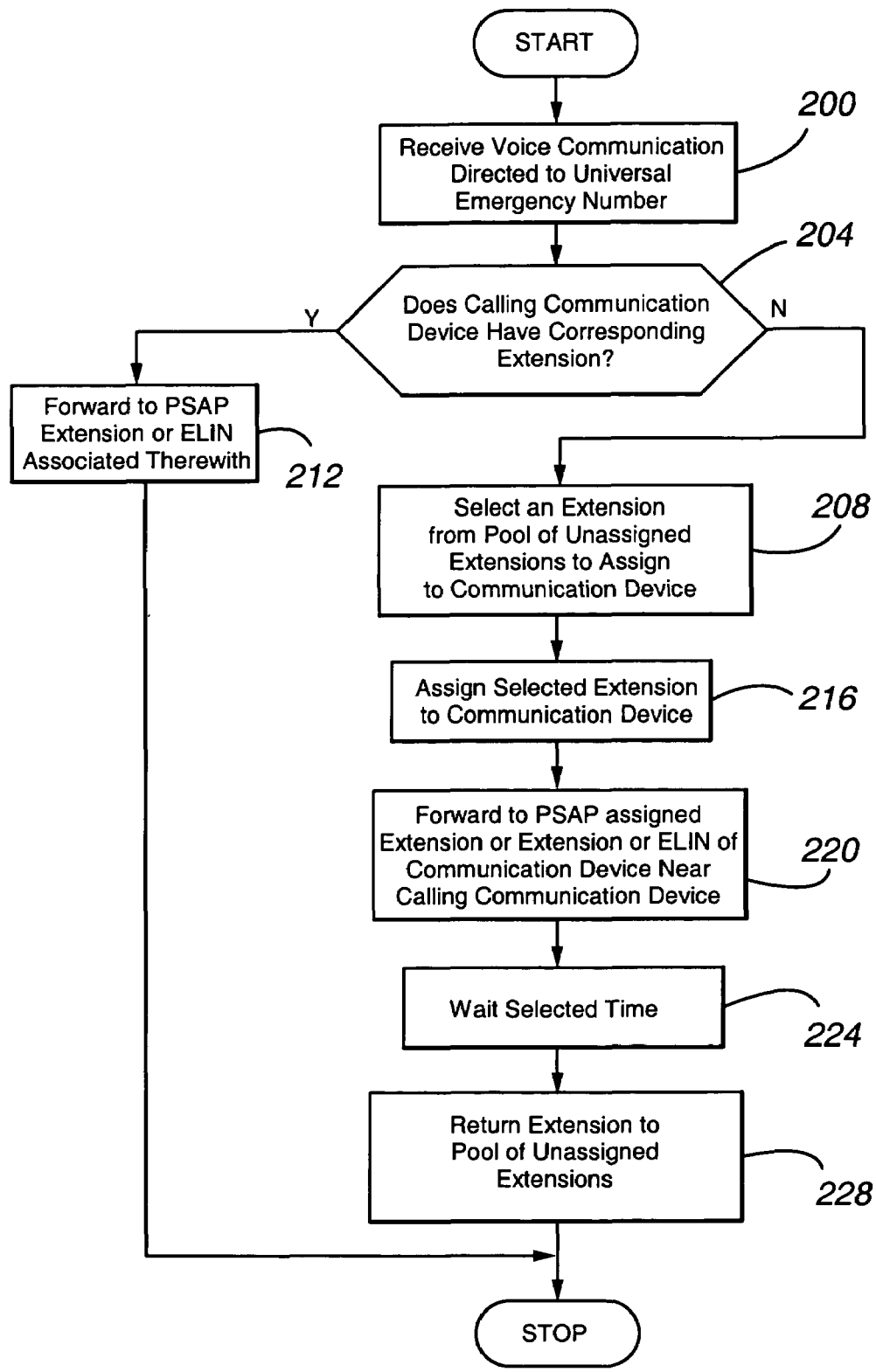

The operation of the emergency location agent will now be described with reference to FIGS. 1 and 2.

In step 200, the switch/server receives a voice communication directed to the universal emergency number or the number of a crisis alert station or attendant.

In decision diamond 204, the agent 146 determines whether the calling communication device currently has a corresponding extension number (or whether the communication device is in the TTI state). When the calling communication device currently has a corresponding extension number, the agent 146, using the mapping tables in the emergency location information 154, selects an appropriate extension (such as an ELIN), that best describes to the PSAP the physical location of the calling communication device, and forwards the selected extension to the PSAP. When the calling communication device currently is without a corresponding extension number, the agent 146 proceeds to step 208.

In step 208, the agent 146 selects an extension from the set or pool of unassigned extensions 150 to assign temporarily to the calling communication device and, in step 216, assigns the selected extension to the communication device. The selection may be based on any suitable criteria or completely arbitrary. The assignment of the extension to the communication device causes the device to no longer be in the TTI state. The assigned extension is preferably administered to have the same Class of Restriction or COR (or call permissions) as TTI-state communication devices are provided. While the extension is assigned to the communication device, the device's display may be the same as the display for TTI-state communication devices (which typically identifies the port number to which the device is connected followed by a character string such as TTI_port) or be modified to be the same as a non-TTI-state device. The latter approach may be desired to provide the selected and assigned extension number to the user or viewer (e.g., crisis alert personnel) of the communication device. To simplify device configuration, the features accessible by the communication device may be limited only to call origination and call answering. To avoid a user assigning a number in the set of extension numbers to administered features, such as an ELIN, the extensions in the pool of unassigned extensions are prohibited from being entered into any administration field. In a preferred configuration, the processor in the switch/server is fast enough to select any extension number that is currently unassigned and not used in any administration field. When the number has been picked, the number is prohibited from being used as input to any administration field. In another configuration, extension numbers are pre-designated as being available for use by the agent 146. In this configuration, the agent 146 is not required to check the thousands of administration fields during an E911 call. As will be appreciated, any delay in directing a return E911 call is unacceptable. In this configuration, the designated extension numbers are entered into appropriate administration fields to indicate their availability to the agent 146.

After the extension is selected and assigned, the agent 146, in step 220, forwards to the PSAP the assigned extension and/or an extension (typically the ELIN) that is within a selected spatial distance of the calling communication device. The selected distance may be no greater than the maximum location distance mandated by local regulations and may be as granular as desired.

In step 224, the agent 146 waits a selected time and, in step 228, the extension is returned to the set 150 after the selected time has passed. Although the timer may be initiated at any time, it is preferred that the timer be initiated after termination of the current call to the PSAP. This would ensure that the extension is not returned to the set 150 while the call is still active (as could be the case if the timer is started at the initiation of or during the duration of the call) and that the PSAP was given sufficient time after a premature drop of the call in which to call back the calling communication device. The normal value of the selected time is 15 to 60 minutes. The value can be selected to expire when call forwarding or the emergency call back period expires.

A number of variations and modifications of the invention can be used. It would be possible to provide for some features of the invention without providing others.

For example in one alternative embodiment, the selected and assigned extension is the corresponding ELIN itself. In that event, no forwarding or bridging is required. However, this approach limits the set 150 to only one extension for each subnet or range of DCP ports.

In another alternative embodiment, the assignment of an extension to the requested but unnamed station is effected when a station enters the unnamed state and before an emergency or crisis alert call is received. To ascertain the geographic location of the unnamed station, periodic location requests are sent to, appropriate network nodes and/or other switch/server modules. The physical location determination is periodically made at expiration of a selected time interval or upon receipt of a call to a universal emergency number.

In another alternative embodiment, the use of the pooled, unassigned extensions can be used for non-emergency applications. The numbers could be dynamically assigned by the switch/server to any number of communication devices based on the needs of the time or to support system capabilities needing temporary use of permanently addressable numbers. For example, the pool of numbers can be used to provide phone mobility for visiting users. To implement this embodiment, a subscriber would, for example, at another office serviced by the enterprise network enter an access code into a station. In response, the switch/server assigns to the station an extension from the set 150. That number is assigned to the station for a selected period of time, after which it is returned to the set 150. The benefit of this approach is that the switch/server would require fewer extension numbers and therefore would lower operating costs.

In another alternative embodiment, the agent noted above is implemented by a logic circuit, such as an ASIC, or by a combination of software and a logic circuit.

In another alternative embodiment, the communication protocols used by the various communication media 118, 122, and 126 can be any suitable protocol. Examples include proprietary digital, Asynchronous Transfer Mode, Integrated Services Digital Network Primary Rate Interface (ISDN PRI), Integrated Services Digital Network Basic Rate Interface (ISDN BRI), H.323, and SIP.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing emergency location information to an emergency service provider, comprising:
    (a) receiving, from a registered communication device, an emergency contact;
    (b) determining whether the communication device has a corresponding assigned extension;
    (c) when the communication device has no corresponding assigned extension, assigning, from a set of unassigned extensions at least one of which is not an emergency location information number, an extension to the communication device, wherein the assigned extension is not an emergency location information number; and
    (d) forwarding, to emergency personnel, at least one of the assigned extension and an extension different from the assigned extension.

2. The method of claim 1, wherein the determining step (b) is performed before the receiving step (a), wherein, after the assigning step (c) the features accessible by the communication device are limited to call origination and call answering, and wherein the assigned extension is not a Direct Inward Dialing extension.

3. The method of claim 1, further comprising:
    (e) determining when a selected time interval has expired; and
    (f) when the selected time interval has expired, unassigning the assigned extension from the communication device and returning the unassigned extension to the set of unassigned Sextensions, wherein the set of unassigned extensions are prohibited from being entered into an administration field.

4. The method of claim 3, further comprising:
    (g) initiating a timer to track the expiration of the selected time interval, wherein the timer is initiated when the current contact to the emergency personnel is terminated.

5. The method of claim 1, wherein, in the assigning step (c), the assigned extension is associated with a calling device identifier.

6. The method of claim 5, wherein the calling device identifier is at least one of a switch host name, a port number, Uniform Resource Identifier, an IP address, and a Media Access Control or MAC address.

7. The method of claim 1, wherein the at least one of the assigned extension and an extension different from the assigned extension is the assigned extension.

8. The method of claim 1, wherein the at least one of the assigned extension and an extension different from the assigned extension is the extension different from the assigned extension.

9. The method of claim 8, wherein the extension different from the assigned extension is an Emergency Location Information Number or a location identification number, wherein the communication device state is at least one of unmerged x-port, TTI station, dissassociated station, and unnamed registered station, and wherein, in response to the outgoing emergency contact, an incoming contact is received from emergency personel and the incoming contact is at least one of forwarded and bridged to the extension assigned in step (c).

10. The method of claim 1, after the contact with emergency personnel is terminated, further comprising:
   (e) receiving an incoming contact from emergency personnel;
   (f) when the incoming contact is received within a selected time after termination of the earlier contact, forwarding the incoming contact to the assigned extension.

11. The method of claim 1, wherein the communication device, after assignment of the extension, has the same Class of Restriction and/or call permissions as the communication device had immediately before the assignment.

12. A computer readable medium comprising instructions to perform the steps of claim 1.

13. A logic circuit operable to perform the steps of claim 1.

14. A system for providing emergency location information to an emergency service provider, comprising:
   (a) an input operable to receive, from a registered communication device, an emergency contact; and
   (b) an agent operable to (i) determine whether the communication device has a corresponding assigned extension; (ii) when the communication device has no corresponding assigned extension, assign, from a set of unassigned extensions at least one of which is not an emergency location information numbers, an extension to the communication device; and (iii) forward at least one of the assigned extension and an extension different from the assigned extension to emergency personnel, wherein the assigned extension is not an emergency location information number.

15. The system of claim 14, wherein the agent performs the determining operation before the receiving operation, wherein, after the assigning step (c) the features accessible by the communication device are limited to call origination and call answering, and wherein the assigned extension is not a Direct Inward Dialing extension.

16. The system of claim 14, wherein the agent is further operable to (iv) determine when a selected time interval has expired and (v) when the selected time interval has expired, unassign the assigned extension from the communication device and return the unassigned extension to the set of unassigned extensions and wherein the set of unassigned extensions are prohibited from being entered into an administration field.

17. The system of claim 16, further comprising:
   a timer to track the expiration of the selected time interval, wherein the timer is initiated when the current contact to the emergency personnel is terminated.

18. The system of claim 14, wherein, in the assigning operation, the agent associates the assigned extension with a calling device identifier.

19. The system of claim 18, wherein the calling device identifier is at least one of a switch host name, a port number, Uniform Resource Identifier, an IP address, and a Media Access Control or MAC address.

20. The system of claim 14, wherein the at least one of the assigned extension and an extension different from the assigned extension is the assigned extension.

21. The system of claim 14, wherein the at least one of the assigned extension and an extension different from the assigned extension is the extension different from the assigned extension.

22. The system of claim 21, wherein the extension different from the assigned extension is an Emergency Location Information Number or a location identification number, wherein the communication device state is at least one of unmerged, x-port, TTI station, dissassociated station, and unnamed registered station, and wherein, in response to the outgoing emergency contact, an incoming contact is received from emergency personel and the incoming contact is at least one of forwarded and bridged to the extension assigned in step (c).

23. The system of claim 14, wherein the agent is further operable, after the contact with emergency personnel is terminated, to direct an incoming contact from emergency personnel to the assigned extension, when the incoming contact is received within a selected time after termination of the earlier contact and wherein the communication device, after assignment of the extension, has the same Class of Restriction and/or call permissions as the communication device had immediately before the assignment.

24. A method for providing emergency location information to an emergency service provider, comprising:
   (a) first receiving, from a registered communication device, an emergency contact;
   (b) second determining whether the communication device has a corresponding assigned extension;
   (c) when the communication device has no corresponding assigned extension, assigning, from a set of unassigned extensions at least one of which is not an emergency location information number, an extension to the communication device, wherein the assigned extension is not an emergency location information number;
   (d) forwarding, to emergency personnel, emergency location information number corresponding to the location of the communication device;
   (e) initiating a timer to track the expiration of the selected time interval, wherein the timer is initiated when the current contact to the emergency personnel is terminated;
   (f) determining when a selected time interval has expired; and
   (g) when the selected time interval has expired, unassigning the assigned extension from the communication device and returning the unassigned extension to the set of unassigned extensions, wherein the set of unassigned extensions are prohibited from being entered into an administration field, wherein the communication device state is at least one of unmerged, x-port, TTI station, dissassociated station, and unnamed registered station, wherein, when in response to the outgoing emergency contact an incoming contact is received from emergency personel, the incoming contact is at least one of forwarded and bridged to the assigned extension assigned, and wherein the communication device, after assignment of the extension, has at least one of the same or lower Class of Restriction and/or the same or fewer call permissions as the communication device had immediately before the assignment.

* * * * *